United States Patent
Simmonds et al.

[15] 3,679,926
[45] July 25, 1972

[54] DYNAMOELECTRIC MACHINE WITH IMPROVED SIDE FILLERS FOR COIL RETENTION

[72] Inventors: Leonard B. Simmonds; John C. Botts, both of Monroeville, Pa.

[73] Assignee: Westinghouse Electric Corporation, Pittsburgh, Pa.

[22] Filed: Jan. 20, 1971

[21] Appl. No.: 108,040

[52] U.S. Cl.....................................310/214, 310/215
[51] Int. Cl...........................................H02k 3/48, H02k 3/36
[58] Field of Search.................................310/214, 215

[56] References Cited

UNITED STATES PATENTS

| | | | |
|---|---|---|---|
| 2,320,866 | 6/1943 | Hill | 310/214, 310/215 |
| 2,417,746 | 3/1947 | Fletcher | 310/215 |
| 2,701,316 | 2/1955 | Willits et al. | 310/215 X |
| 3,391,294 | 7/1968 | Moxie et al. | 310/215 X |

Primary Examiner—L. T. Hix
Assistant Examiner—Mark O. Budd
Attorney—A. T. Stratton, F. P. Lyle and Gordon H. Telfer

[57] ABSTRACT

For retention of coils in cores of large dynamo-electric machines, a side filler is used between the insulated coil and the core slot wall with different surface characteristics on each side of the side filler. The surface adjacent the slot wall has a coefficient of friction that is relatively high compared with the coefficient of friction of the surface adjacent the coil. The surface adjacent the slot wall also tends to have a greater degree of adhesion with the slot wall under heat and pressure, than does the surface of the side filler adjacent the coil. These qualities can be provided by employing as the side filler a member having a surface comprising a fluorocarbon polymer adjacent the coil while the other surface includes a different, more conventional, resinous material. The combination of the invention permits free movement of the coil during thermal cycling without tending to remove the side filler from the slot and without damaging the coil insulation.

7 Claims, 2 Drawing Figures

PATENTED JUL 25 1972

3,679,926

WITNESSES
Theodore F. Wrobel
James L. Young

INVENTORS
Leonard B. Simmonds
and John C. Botts
BY
Jordan W. Colton
ATTORNEY

3,679,926

DYNAMOELECTRIC MACHINE WITH IMPROVED SIDE FILLERS FOR COIL RETENTION

BACKGROUND OF THE INVENTION

1. Field of the Invention

This invention relates to dynamoelectric machines and particularly to means for retaining coils in the cores thereof.

2. Description of the Prior Art

In turbine generators, and other large, high voltage dynamoelectric machines, elements called side fillers are conventionally used between the coils and the side walls of a core slot to retain them in position and make them less subject to vibration. In certain machine applications, such as large peaking generators, there is frequent large thermal cycling necessarily resulting in expansion and contraction of the coil conductors. This expansion and contraction can cause damage to the coil insulation and is a possible cause of insulation failure. It has in the past been the practice to employ a side filler on only one side of the coil. The insulation on the side of the coil directly adjacent the slot wall is most subject to abrasion by the edges of the metal laminations of the core. Furthermore, the expansion and contraction of the coil has also had a tendency to cause the side filler to be dragged out of the slot because under the heat (e.g. up to about 80° C) and pressure encountered in operation there is a tendency for the side filler to stick to the coil insulation. The longitudinal movement of the side fuller is generally referred to as "walk out". The material of the side filler, typically of a glass fiber impregnated with an epoxy phenolic or melamine type resin, has in the past been made with the same surface characteristics on each side.

Fluorocarbon polymers are a known class of materials that have previously been disclosed for use in the insulating material on electrical conductors. U.S. Patent No. 3,488,537 is an example of such prior art. There is not, however, any known disclosure of the use of such materials as a constituent of side fillers for coil retention.

SUMMARY OF THE INVENTION

In accordance with this invention a dynamoelectric machine is provided wherein the coils are retained in the core slots by a side filler on each side of the coil which side filler has a surface adjacent the coil insulation that has a lower coefficient of friction and less of a tendency to stick than the surface of the side filler that is adjacent the slot wall. The invention may be used to retain coils in either a stator or rotor core.

The requisite surface characteristics of the side filler can be provided by using a laminate that includes a first layer portion of a resin (e.g. an epoxy, phenolic, or melamine type resin) impregnated glass fiber, such as has been previously used in side fillers, with a surface treated with a low friction, non-stick material such as fluorocarbon polymer. Polytetrafluoroethylene is one example of a fluorocarbon polymer. The low friction, non-stick material can be provided in a separate glass fiber layer that is laminated to the conventional resin impregnated portion of the side filler.

When such a side filler is used on each side of the coil with the low friction, non-stick surface adjacent the coil, the thermal cycling of the coil is found not to result in damage to the coil insulation and does not tend to cause the side filler to "walk out". As in the past, it is desirable that the side filler have a controlled conductivity for voltage grading and also that while it is relatively thin in relation to coil dimensions, it is strong enough to be driven between the coil and the slot wall.

DESCRIPTION OF PREFERRED EMBODIMENTS

Figure 1:
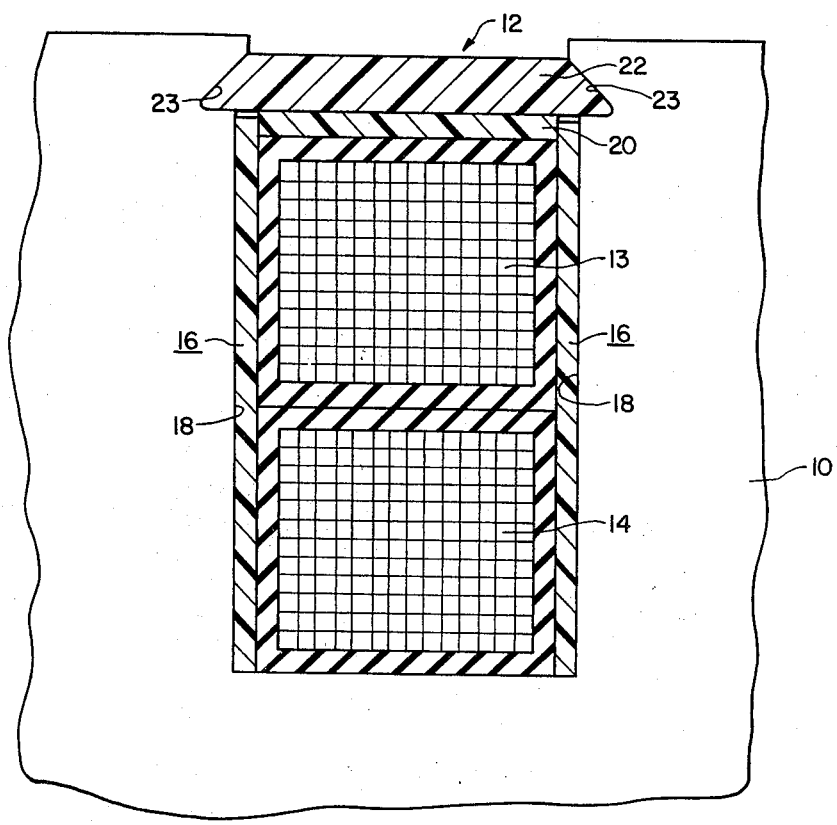
FIG. 1 is a partial elevational view of a typical core slot showing, in cross section, coils and filler elements in accordance with an embodiment of this invention.

Referring to the drawing, FIG. 1 shows a portion of a stator or rotor core 10 that normally comprises a plurality of stacked metal laminations disposed parallel to the plane of FIG. 1. One longitudinal core slot 12 is shown in the periphery of the core with two insulated coils 13 and 14 therein, for purposes of illustration. Reference numerals 13 and 14 refer collectively to both the coil conductive elements and the layer of insulating material immediately surrounding them.

In accordance with this invention, a side filler 16 is provided between the coils 13 and 14 and the slot wall 18 on each side. Other insulating members are provided adjacent the opening of slot 12. The latter elements, which may be conventional, include one or more slot filler strips 20 and a slot wedge 22 that is secured in the core 10 by inter-locking with grooves 23 therein to prevent any outward movement of the coils 13 and 14 from the slot 12.

Each side filler 16 is provided with a surface adjacent the coils 13 and 14 that has a lower coefficient of friction and less of a tendency for stickiness, under heat and pressure, than the surface of the side filler 16 adjacent the slot wall 18.

Figure 2:
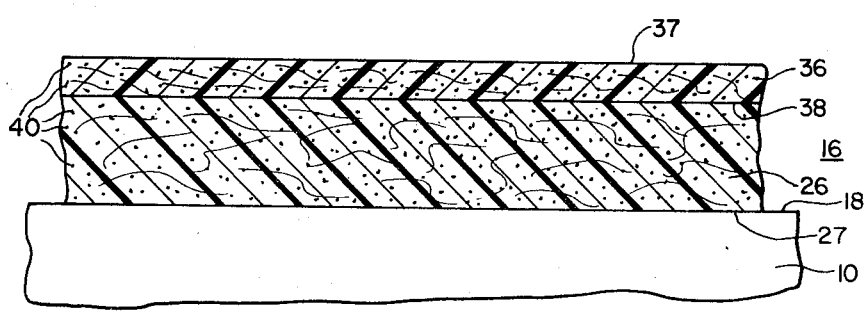
FIG. 2 is a cross-sectional view of a side filler in accordance with an embodiment of the invention.

Referring to FIG. 2, the desired characteristics can be provided by using as the side filler 16 a laminate of a first portion 26 that has a surface 27 with a higher coefficient of friction than does a surface 37 of a second portion 36. The first portion 26 of the laminate that is positioned adjacent the slot walls 18 can be. for example, of a resin impregnated glass fiber material as has been previously employed for the entire structure of side fillers such as one employing epoxy, phenolic, or melamine type resins. The second portion 36 of the laminate that provides a low friction, non-stick surface 37 adjacent the coils can be, for example, of a glass fiber material impregnated with a polymer having a distinctly lower coefficient of friction on its finished surface and less tendency to stick under heat and pressure than the resins mentioned above. Fluorocarbon polymers are in a class whose members are suitable to provide the surface 37. One such material that may be employed for this purpose is polytetrafluorethylene, commercially available under the trademark Teflon. A glass fiber material impregnated with Teflon material, as commercially available, requires treatment of the surface to be bonded to the other portion of the laminate. To get the required degree of adhesion it is suitable to etch the bonding surface 38 with sodium. Both of the portions 26 and 36 of the laminate can be provided with particles of carbon black 40 or other conductive filler material in amounts sufficient to provide the required conductivity so that the surface resistivity is suitable for voltage grading as has been the practice in the past with side fillers. Such resistivity is typically of the order of several hundred ohms per square.

The invention is not limited to the use of particular type of laminate described. Such a structure is presently preferred because it has been found suitable both in its functional aspects and also in that it permits the bulk of the side filler to consist of lower cost materials. The first portion 26 of the laminate may have a thickness about two to three times that of the second portion of the laminate, as an example. In the practice of the invention it is suitable to employ side fillers of different thicknesses because an initial side filler placed between the coils and the slot wall may be of minimum thickness since it need not be driven in with force. For this purpose a laminate having a total thickness of about 20 mils of which only about 5 mils is of the type impregnated with a fluorocarbon polymer is suitable while the second side filler, which must be driven in, is of a total thickness of about 30 mils of which about 10 mils is of the fluorocarbon polymer impregnated material.

The invention was successfully tested using a core in which coils were provided in various slots of which some were secured by side fillers in accordance with the prior art and some were secured by the laminate described above. After several months of cycling in which the coils were repeatedly subjected to expansion and contraction, the side filler in accordance with the present invention did not walk out of the slot while all of the slots that had the conventional side filler exhibited this characteristic "walk out". Upon disassembly of the test apparatus it was seen that the insulation on the coils that had been secured by conventional slot fillers had sustained noticeable damage in the form of abrasion while that on coils secured by the side filler in accordance with this invention was still in its original condition.

With the readily available materials that have been used to date it has been found suitable to provide a coefficient of friction on the surface to be disposed adjacent the coil that is about 60 percent or less of the coefficient of friction on the other surface. In the typical case this means that the coefficient of friction on the side where there is to be permitted free movement of the coil is to be no more than about 0.13.

For purpose of further example, the following more detailed description is given of the preparation of side fillers in accordance with the present invention.

Glass cloth is withdrawn from a roll and passed through a varnish dip pan containing a thermosettable phenolic resin solution so that the glass cloth is impregnated or soaked with the solution. The phenolic resin is a cresylic acid formaldehyde resin. The solution also contains conductive particles which may conveniently be acetylene black. The particle size of the acetylene black is such that the material will remain substantially homogeneously dispersed or suspended in the varnish solution. The treated or impregnated glass cloth passes into an oven so that the solvent is driven off and the phenolic resin is advanced to the semi-cured B-stage. In this form, the resin is essentially dry and non-tacky to the touch but will fuse and flow when heated. The resin is not yet fully cured to its thermoset stage. A resin ratio (ratio of the weight of resin and glass cloth to weight of glass cloth) of about 2.3 and a "greenness" of 3–15 percent is preferred for the treated glass cloth. The "greenness" is the proportion of resin that is forced out of a stack of treated sheets at 175° C and 1000 psi in five minutes compared to the total initial sample weight.

Two sheets of the treated glass cloth (thickness after treatment about 0.0065 inch) and one sheet of a 5 mil polytetrafluoroethylene impregnated glass cloth are placed together in a stack with the sodium etched bondable surface of the polytetrafluoroethylene impregnated cloth in contact with a surface of a sheet of treated glass cloth. The treated glass cloth sheets are next to each other. The stack is placed between steel pressing plates and inserted into a laminating press where the stack is molded at 1000 psi at 175° C for about one hour.

It should be noted that other thermosettable phenolic resins adapted to have good electrical properties are known and may be used in treating the glass cloth sheets. For details, reference may be made to U.S. Pat. No. 3,048,508. Suitable thermosettable epoxy resins are also known and are described, for example, in U.S. Pat. No. 2,956,613.

We claim:
1. A dynamoelectric machine comprising:
a core having a core slot at a periphery thereof; an insulated coil disposed in said core slot; a side filler disposed in said slot between each side of said coil and the adjacent core surface, each said filler having a surface adjacent said coil that has a coefficient of friction less than the coefficient of friction of the surface of said side filler adjacent said core surface, each said side filler comprising a laminate of which a first portion which is at said surface adjacent said coil comprises a glass fiber material impregnated with a fluorocarbon polymer.

2. The subject matter of claim 1 wherein: the coefficient of friction of said side filler surface adjacent said coil is no more than about 60 percent of the coefficient of friction of said side filler adjacent said core surface.

3. The subject matter of claim 2 wherein: the coefficient of friction of said side filler surface adjacent said coil is no more than about 0.13.

4. The subject matter of claim 1 wherein:
said fluorocarbon polymer is polytetrafluoroethylene.

5. The subject matter of claim 1 wherein:
said laminate comprises a second portion adjacent said core surface that is of a glass fiber material impregnated with a resin selected from the group consisting of epoxy, phenolic and melamine type resins.

6. The subject matter of claim 5 wherein said second portion has a thickness about two to four times the thickness of said first portion.

7. The subject matter of claim 5 wherein:
said first and second portions include particles of conductive filler material.

* * * * *